April 6, 1954
J. J. KONTRA
2,674,028
UNIVERSAL LATHE TOOL
Filed Nov. 10, 1951
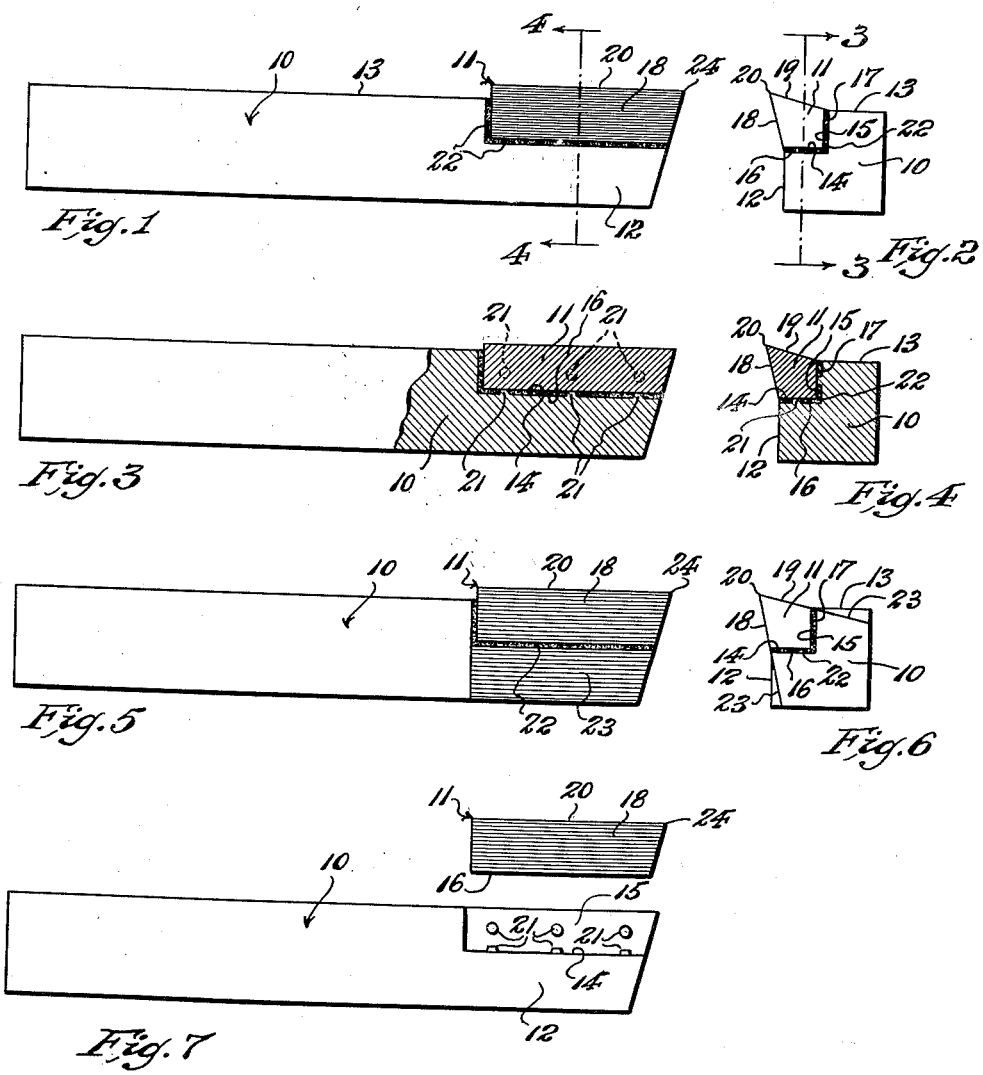
INVENTOR.
John J. Kontra,
BY George D. Richards,
Attorney

Patented Apr. 6, 1954

2,674,028

UNITED STATES PATENT OFFICE 2,674,028

UNIVERSAL LATHE TOOL

John J. Kontra, Roselle Park, N. J.

Application November 10, 1951, Serial No. 255,783

3 Claims. (Cl. 29—95)

This invention relates to an improved lathe tool.

The invention has for an object to provide a single lathe tool of such novel form and structure that it can optionally be used to perform many different lathe operations in either a right or left hand setting thereof; for example, the single tool can be used for either right or left hand outside turning operations, for either right or left hand facing operations, and for either right or left hand inside turning or boring operations.

The invention has for another object to provide a lathe tool comprising a shank or body having affixed thereto a separate cutting tip of selected cutting material, said cutting tip being of such novel shape and so related to the shank or body as to permit universal use of a single tool to perform various operations heretofore usually requiring use of a variety of separate and different special tools, and consequently, by avoiding necessity of providing a plurality of different tools, greatly reducing the cost of tool equipment and inventory in the shop, while at the same time reducing use of critical and costly cutting materials with resultant economy and conservation of such critical materials.

A further object of the invention is to provide a lathe tool with a precast cutting tip of novel shape and of long and narrow dimensions so that in dressing the same many more effective cutting edges can be produced than is the case with respect to tipped tools of conventional form; and at the same time the novel shape of the cutting tip of the tool and its relation to the tool shank according to this invention facilitates resharpening, dressing or grinding thereof with less loss and waste of cutting material.

Another object of the invention is to provide a lathe tool, comprising a shank to which a separate cutting tip of selected material is attached by brazing, wherein the tip seat of the shank is provided with a plurality of spaced studs projecting from its seating faces through the braze intermediate said seating faces and the faces of the cutting tip opposed thereto, said studs being adapted to abut and support the cutting tip as adhered to the tip seat by the braze, and thus to prevent squeezing displacement or collapse of the braze and resultant canting or rocking of the cutting tip under the load applied to the cutting edge thereof in use, with risk of rocking and breaking away of the cutting tip from the shank under applied load; and, furthermore, whereby the supporting studs so space the cutting tip from the tip seat of the tool shank as to permit a thicker intermediate body of braze to be used, which is better adapted to absorb stresses induced by vibration or by the differences in coefficients of expansion respectively possessed by the different cutting tip and tool shank materials.

The above and other objects of the invention will be understood from a reading of the following description thereof in connection with the accompanying drawings, in which:

Fig. 1 is a side elevational view of the improved universal lathe tool of this invention; Fig. 2 is an end view of the same viewed from the right in Fig. 1; Fig. 3 is a longitudinal sectional view of the same, taken on line 3—3 in Fig. 2; and Fig. 4 is a cross-sectional view thereof, taken on line 4—4 in Fig. 1.

Fig. 5 is a side elevational view of a modified form of the universal lathe tool according to this invention; and Fig. 6 is an end view of the same viewed from the right in Fig. 5.

Fig. 7 is a side elevational view of the tool shank or body with the cutting tip removed but positioned ready for application thereto.

Similar characters of reference are employed in the above described views, to indicate corresponding parts.

Referring to the drawings, the reference character 10 indicates the shank or body of the tool and 11 the cutting tip of said tool.

Said shank or body of the tool may be produced from any suitable metal having requisite toughness, but which need not possess cutting characteristics. The shank or body 10 is of substantially square cross-sectional shape. At its outer end portion, the shank or body 10 is provided, in an upper corner thereof between a side face 12 and its top face 13, with a cutting tip receiving socket or seat of substantially right angular cross-section. This socket or seat is defined by a bottom wall 14 and an inner side wall 15. The socket or seat so formed is of a length substantially corresponding to the length of a cutting tip 11 to be seated and fixed therein.

The cutting tip 11 may be produced from any suitable material having the desired cutting characteristics. The cutting tip can be, and in most cases will preferably, be made of tungsten carbide by reason of the great hardness, high cutting efficiency and durability of this material.

The cutting tip 11, according to this invention, is formed with a bottom 16 and a back 17 to provide a seating portion of substantially right angular cross-section. The seating portion thus provided is dimensioned correspondingly to the dimensions of the socket or seat 14—15 of the shank or body 10, so as to be receivable in said socket or seat. Said cutting tip is further formed with an oblique front face 18 and an oblique top face 19. These front and top faces 18 and 19 are of widths exceeding the widths of the bottom 16 and back 17 of the tip seating portion, and are disposed in outwardly projecting and acutely angular convergent relation, thus providing the tip with an obliquely projecting, longitudinally extending cutting edge 20 which, when the tip is assembled with and affixed to the shank or body 10, is outwardly offset from the edge of the tool shank formed by the juncture of the faces of the adjacent side and top of the shank or body 10, and so as to lie in and symmetrical to a diagonal plane through said shank or body. By reason of such form and outwardly projecting disposition of the cutting edge 20 of the cutting tip there is not only adequate clearance provided between the same and the shank or body when the tool is in use, but also the tool can readily be set for optional right or left hand operation in use.

The novel cutting tip formation as above characterized can be produced by casting, thereby avoiding necessity for wasteful grinding, and thus conserving tip material, especially if said material is in critical short supply.

The cutting tip 11 is fixed in the socket or seat of the shank or body 10 by brazing or soldering the bottom and back of said tip to the bottom and inner side walls 14 and 15 of said socket or seat. One of the more specific objects of this invention, however, is to provide a type of uniting connection between the cutting tip and shank or body which so supports the former relative to the latter as to reduce tension in the tip, and thereby to reduce hazard of breakage in use. So supporting the tip permits application of greater cutting pressure to the tool in use, and therefore allows faster cutting to be achieved. To provide such desirable supporting attachment of the cutting tip to the shank or body, the bottom wall 14 and inner side wall 15 of the socket or seat formed in said shank or body are each provided with a plurality of suitably disposed and relatively spaced apart spacing studs 21, which are adapted to extend through the intermediate body of brazing material, and thus to be abutted by the bottom 16 and back 17 of the seating portion of the tip, whereby to substantially space apart the opposed surfaces of these parts when the tip is mounted on the shank or body. When the tip is thus assembled with the shank or body, the intervening spaces are filled with silver solder or other suitable soldering or brazing material 22, whereby to unite the tip and shank or body in unitary relation. By this type of union, the interposed mass of solder or brazing material forms the means for uniting the tip to the shank or body, while the studs 21 provide positive support between these parts which is effective to prevent squeezing displacement or collapse of interposed brazing material under cutting tip load, especially in the outer end regions of the socket or seat, occurrence of which risks rocking of the tip and breaking away thereof from its attached relation to the tool shank, and which is also effective to reduce stress and strains developed by the cutting action of the tip, or by differences in the coefficients of expansion respectively possessed by the different cutting tip and tool shank materials.

The spacing studs 21 may be formed either as integral parts of the shank or body, or as separate elements suitably connected thereto. In the latter case, said spacing studs may comprise selected material different from the material of the shank or body, if so desired. The studs are of substantial height and thus permit a thicker mass of brazing material 22 to be used, thereby increasing the ability thereof to absorb stresses and vibration.

As shown in Figs. 5 and 6, if additional clearance is desired between the cutting edge 20 of the tip and adjacent faces of the shank or body 10, said latter faces may be ground away to provide clearance sections 23 respectively extending in the inclined or oblique planes of the front and top faces 18 and 19 of the tip.

The operative or front end of the tool is usually undercut or beveled as shown, whereby to produce a sharp outwardly offset cutting end or point 24 at the free extremity of the tip 11, with receding clearance space extending below such cutting end or point.

By reason of the novel form and substantial length of the cutting tip, the cutting end or point thereof may be resharpened by grinding many times before useful life of the tool is exhausted.

Having now described my invention, I claim:

1. A lathe tool adapted for optional use in either right or left hand application to work, said tool comprising a shank of substantially square cross-section having at its outer end portion a countersunk longitudinal tip supporting seat between a side and top face thereof, a cutting tip embraced by said seat, a body of brazing material intermediate said seat and said tip to unite the latter to the former, said tip having external side and top faces respectively outwardly inclined relative to the respective planes of said side and top faces of the shank in acutely angular converging and symmetrical relation thereto, whereby to provide a longitudinally extending cutting edge which projects obliquely from and in outwardly offset relation to the edge of the shank intermediate said side and top faces thereof and coincident to a medial transverse diagonal plane through the shank which intersects said edge thereof, and a plurality of relatively spaced studs projecting from the faces of the tip supporting seat through the body of brazing material into abutting and supporting relation to the cutting tip lodged in said seat.

2. A lathe tool comprising a shank having at its outer end portion a countersunk longitudinal tip supporting seat, a cutting tip lodged in said seat, a body of brazing material intermediate said seat and tip to unite the latter to the former, and a plurality of relatively spaced studs projecting from the surfaces of the tip supporting seat through the body of the brazing material into abutting and supporting relation to the cutting tip lodged in said seat.

3. A lathe tool adapted for optional use in either right or left-hand application to the work, said tool comprising a shank of substantially rectangular cross-section having at its outer end portion a countersunk longitudinal tip supporting seat between a side and top face thereof, a cutting tip coextensive with and fixed in said seat, said tip having external side and top faces respectively outwardly inclned relative to the respective normal planes of said side and top faces of the shank in acutely angular converging and symmetrical relation, whereby to provide a longitudinally extending cutting edge which projects obliquely from and in outwardly offset relation to the edge of the shank intermediate said side and top faces thereof and coincident to a medial transverse diagonal plane through the shank which intersects said edge thereof, portions of said side and top faces of the shank adjacent to said cutting tip being cut away to provide clearance faces extending respectively in the respective planes of said side and top faces of the cutting tip, the bottom and inner walls of the tip supporting seat of the shank each having a plurality of relatively spaced projecting studs adapted to abut the internal side and bottom faces of the tip and thus to support the seated tip from and in spaced relation to said walls, and solder filling the space intermediate the seated tip and said walls and around said studs, whereby to unite the tip to the shank.

References Cited in the file of this patent

UNITED STATES PATENTS

| Number | Name | Date |
|---|---|---|
| 1,443,752 | Lindmark | Jan. 30, 1923 |
| 1,903,077 | Wolf | Mar. 28, 1933 |
| 2,308,569 | St. Clair | Jan. 19, 1943 |

FOREIGN PATENTS

| Number | Country | Date |
|---|---|---|
| 138,141 | Great Britain | Feb. 5, 1920 |
| 339,016 | Germany | July 11, 1921 |
| 442,416 | Great Britain | Feb. 7, 1936 |
| 543,822 | Great Britain | Mar. 13, 1942 |

OTHER REFERENCES

Tool and Die Journal, July, 1946, pgs. 80–83.
American Machinist, August 3, 1944, page 83.